(12) United States Patent
Osunkwo et al.

(10) Patent No.: US 12,462,372 B2
(45) Date of Patent: Nov. 4, 2025

(54) AUTOMATED PART INSPECTION SYSTEM

(71) Applicants: TE Connectivity Services GmbH, Schaffhausen (CH); Tyco Electronics Mexico, S. de R.L. de C.V., Tlalnepantla (MX); Tyco Electronics (Shanghai) Co., Ltd., Shanghai (CN)

(72) Inventors: Sonny O. Osunkwo, Harrisburg, PA (US); Angel Alberto Slistan, Hermosillo Sonora (MX); Jorge Enrique Clayton, Hermosillo Sonora (MX); Lei Zhou, Shanghai (CN); Roberto Francisco-Yi Lu, Bellevue, WA (US); Jiankun Zhou, Middletown, PA (US); Luis Ernesto Thomson Martinez, Middletown, PA (US); Christopher Arce Diaz, Middletown, PA (US); Nicole Castillo Machado, Middletown, PA (US); Julio Waissman, Hermosillo Sonora (MX)

(73) Assignees: TE Connectivity Solutions GmbH; AMP Ameremax, S.A. de C.V; Tyco Electronics (Shanghai) Co. Ltd

( * ) Notice: Subject to any disclaimer, the term of this patent is extended or adjusted under 35 U.S.C. 154(b) by 199 days.

(21) Appl. No.: 17/580,921

(22) Filed: Jan. 21, 2022

(65) Prior Publication Data
US 2022/0375067 A1 Nov. 24, 2022

(51) Int. Cl.
*G06T 7/00* (2017.01)
*G06N 20/00* (2019.01)
*G06V 10/60* (2022.01)
*G06V 10/764* (2022.01)
*G06V 10/774* (2022.01)
(Continued)

(52) U.S. Cl.
CPC .......... *G06T 7/0008* (2013.01); *G06N 20/00* (2019.01); *G06V 10/60* (2022.01); *G06V 10/764* (2022.01); *G06V 10/7747* (2022.01); *G06V 10/82* (2022.01); *H04N 23/56* (2023.01); *H04N 23/66* (2023.01); *G06T 2200/24* (2013.01); *G06T 2207/20081* (2013.01);
(Continued)

(58) Field of Classification Search
CPC .. G06T 7/0008; G06V 10/7747; G06V 10/60; G06V 10/82; G06V 10/764; H04N 23/66; H04N 23/56
See application file for complete search history.

(56) References Cited

U.S. PATENT DOCUMENTS 11,150,200 B1 * 10/2021 Watson ................ G01N 21/956
11,295,173 B2 * 4/2022 Umeno ................. G06F 18/217
(Continued)

Primary Examiner — Rowina J Cattungal

(57) ABSTRACT

A part inspection system includes a vision device configured to image a part being inspected and generate a digital image of the part. The inspection system includes a part inspection module communicatively coupled to the vision device and receiving the digital image of the part. The part inspection module includes an image quality module. The image quality module analyzes the digital image to determine if the digital image achieves a quality threshold. The image quality module generates an image quality output based on the analysis of the digital image. The part inspection module includes an image classifier module. The image classifier module analyzes the digital image to classify the image as a defective part or a non-defective part.

19 Claims, 4 Drawing Sheets

(51) Int. Cl.
*G06V 10/82* (2022.01)
*H04N 23/56* (2023.01)
*H04N 23/66* (2023.01)

(52) U.S. Cl.
CPC ............... *G06T 2207/20084* (2013.01); *G06T 2207/30108* (2013.01); *G06T 2207/30168* (2013.01)

(56) References Cited

U.S. PATENT DOCUMENTS

| | | | |
|---|---|---|---|
| 2018/0204132 A1* | 7/2018 | Liang | G06T 7/75 |
| 2020/0364905 A1* | 11/2020 | Shimodaira | G06N 3/02 |
| 2023/0052350 A1* | 2/2023 | Harada | G06V 10/761 |
| 2023/0145715 A1* | 5/2023 | Takai | G01N 21/88 |
| | | | 382/100 |
| 2023/0196548 A1* | 6/2023 | Ikeda | G06V 10/758 |
| | | | 382/149 |
| 2023/0326191 A1* | 10/2023 | Li | G06N 3/096 |
| | | | 382/155 |

* cited by examiner

AUTOMATED PART INSPECTION SYSTEM

CROSS REFERENCE TO RELATED APPLICATIONS

This application claims benefit to Chinese Application No. 202110557776.3, filed 21 May 2021, the subject matter of which is herein incorporated by reference in its entirety.

BACKGROUND OF THE INVENTION

The subject matter herein relates generally to part inspection systems and methods.

With the development of image processing technologies, image processing technologies have been applied to defect detection in manufactured products. In practical applications, after one or more manufacturing steps, parts may be imaged and the images analyzed to detect for defects, such as prior to assembly of the part or shipment of the part. Some defects are difficult for known image processing systems to identify. Additionally, processing time for the processing system may be extensive when detecting some types of defects or some types of products, leading to slow throughput. Moreover, training time for the processing system leads to increased cost of the system due to the valuable time spent re-training and fine tuning the system. Furthermore, accuracy of the inspection system is affected by many factors, including the calibration or training of the system as well as the quality of the image taken and analyzed.

A need remains for a robust part inspection system and method.

BRIEF DESCRIPTION OF THE INVENTION

In one embodiment, a part inspection system is provided and includes a vision device configured to image a part being inspected and generate a digital image of the part. The inspection system includes a part inspection module communicatively coupled to the vision device and receiving the digital image of the part. The part inspection module includes an image quality module. The image quality module analyzes the digital image to determine if the digital image achieves a quality threshold. The image quality module generates an image quality output based on the analysis of the digital image. The part inspection module includes an image classifier module. The image classifier module analyzes the digital image to classify the image as a defective part or a non-defective part.

In another embodiment, a part inspection method is provided. The method images a part using a vision device to generate a digital image. The method analyzes the digital image through an image quality module of a part inspection system by comparing the digital image to a quality threshold to determine if the digital image passes or fails the quality threshold and analyzes the digital image through an image classifier module of the part inspection system if the digital image passes the quality threshold to determine if the part is defective or non-defective. The method outputs one of a defective output or a non-defective output based on the image analysis of the digital image.

DETAILED DESCRIPTION OF THE INVENTION

Figure 1:
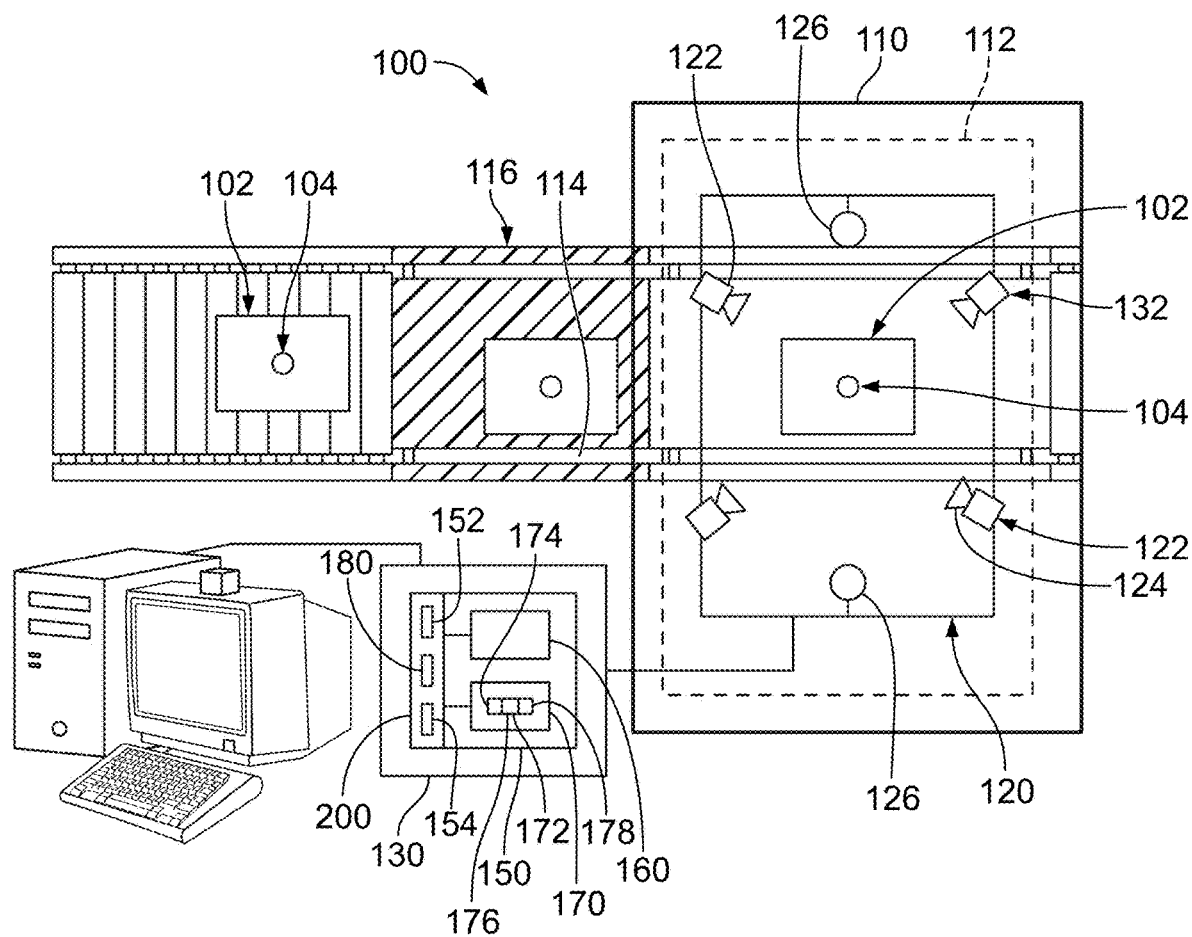
FIG. 1 illustrates a part inspection system in accordance with an exemplary embodiment.

FIG. 1 illustrates a part inspection system 100 in accordance with an exemplary embodiment. The part inspection system 100 is used to inspect parts 102 for defects. In an exemplary embodiment, the part inspection system 100 is a vision inspection system using one or more processors to analyze digital images of the part 102 for defects. The part inspection system 100 may be used to analyze the digital images for one particular type of defect or for multiple, different types of defects. In various embodiments, the part 102 may be an electrical contact or other type of electrical component. The part inspection system 100 may be used to inspect other types of parts in alternative embodiments. In an exemplary embodiment, the part inspection system 100 is used to inspect the parts 102 for burrs or other types of defects after the part 102 are processed. For example, the part 102 may be drilled, cut, stamped or otherwise processed to remove sections of the part 102. The remaining sections of the part 102 may have burrs or other types of defects. The part inspection system 100 analyzes digital images of the part 102 to detect such burrs.

Figure 2:
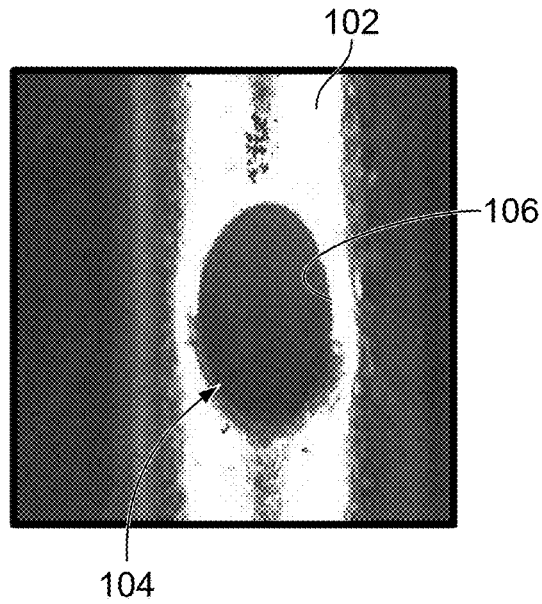
FIG. 2 illustrates images of parts taken by the part inspection system in accordance with an exemplary embodiment.
Figure 3:
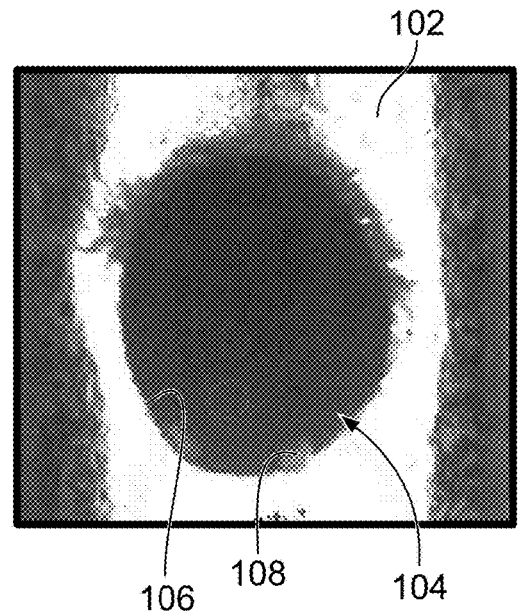
FIG. 3 illustrates images of parts taken by the part inspection system in accordance with an exemplary embodiment.

In an exemplary embodiment, the part 102 includes an opening or cross hole 104 and surrounding areas 106 surrounding the cross hole 104. With additional reference to FIGS. 2-3, FIGS. 2-3 are images of parts taken by the part inspection system 100 in accordance with an exemplary embodiment. FIG. 2 illustrates the part having a defect. FIG. 3 illustrates a part without any defects. The cross hole 104 is defined by one or more edges 106 around the cross hole 104. For example, the part 102 may be a terminal, such as a power terminal having the cross hole 104 formed therethrough. The cross hole 104 may receive a wire or a fastener. The cross hole 104 is formed by drilling or cutting through the part 102 to form the cross hole 104. During the perimeter cutting process, burrs 108 may remain around the edges 106 and extend into the cross hole 104. The part inspection system 100 images the part 102 to determine if any of the burrs 108 are present. If present, the part inspection system 100 determines that the part 102 is defective and may discard the part 102 as scrap or for further processing. If absent (no burrs 108 present), the part inspection system 100 validates the part 102 (part is non-defective) for further use or processes. For example, the part 102 may be collected in a bin or transported downstream for assembly.

With reference back to FIG. 1, the part inspection system 100 includes an inspection station 110. The inspection station 110 may be located downstream of a processing station (for example, a stamping machine, a drill press, a cutting machine, and the like) to inspect the part 102 after processing. In other various embodiments, the inspection station 110 may be located at the processing station. The inspection station 110 includes an inspection zone 112.

In an exemplary embodiment, the inspection station 110 includes a locating feature 114 for locating the part 102 relative to the inspection zone 112. The locating feature 114 may be a table or other support platform used to hold and support the part 102 in the inspection station 110. The locating feature 114 may include one or more walls or other features forming datum surfaces for locating the part 102. The locating feature 114 may include a clamp or bracket holding the part 102. During use, the part 102 is presented at the inspection zone 112 for inspection. For example, the part 102 may abut against the locating feature 114 to locate the part 102 at the inspection zone 112. The part 102 may be moved within the inspection zone 112 by the locating feature 114.

In an exemplary embodiment, the inspection station 110 may include a manipulator 116 for moving the part 102 relative to the inspection station 110.

For example, the manipulator 116 may include a conveyor or vibration tray for moving the part 102 through the inspection station 110. In other various embodiments, the manipulator 116 may include a feeder device, such as a feed finger used to advance the part 102, which is held on a carrier, such as a carrier strip. In other various embodiments, the manipulator 116 may include a multiaxis robot configured to move the part 102 in three-dimensional space within the inspection station 110. In alternative embodiments, the manipulator 116 may be an automated guided vehicle (AGV) configured to move the part 102 between various stations. In other alternative embodiments, the part 102 may be manually manipulated and positioned at the inspection zone 112 by hand.

The part inspection system 100 includes a vision device 120 for imaging the part 102 at the inspection zone 112. The vision device 120 may be mounted to a frame or other structure of the inspection station 110. The vision device 120 includes a camera 122 used to image the part 102. The camera 122 may be movable within he inspection zone 112 relative to the part 102 (or the part 102 may be movable relative to the camera 122) to change a working distance between the camera 122 and the part 102, which may affect the clarity of the image. Other types of vision devices 120 may be used in alternative embodiments, such as an infrared camera, or other type of camera that images at wavelengths other than the visible light spectrum.

In an exemplary embodiment, the part inspection system 100 includes a lens 124 at the camera 122 for controlling imaging. The lens 124 may be used to focus the field of view. The lens 124 may be adjusted to change a zoom level to change the field of view. The lens 124 is operated to adjust the clarity of the image, such as to achieve high quality images.

In an exemplary embodiment, the part inspection system 100 includes a lighting device 126 to control lighting conditions in the field of view of the vision device 120 at the inspection zone 112. The lighting device 126 may be adjusted to control properties of the lighting, such as brightness, light intensity, light color, and the like. The lighting affects the quality of the image generated by the vision device 120. The background behind the part 102 may affect the quality of the image and may be affected by the lighting of the lighting device. Additionally, ambient lighting may affect the quality of the image and may be adjusted to enhance the quality of the image.

In an exemplary embodiment, the vision device 120 is operably coupled to a controller 130. The controller is operably coupled to the vision device 120 to control operation of the vision device 120. The controller 130 is operably coupled to a part inspection module 150 and receives one or more outputs from the part inspection module 150. In an exemplary embodiment, the controller 130 is operatively coupled to one or more secondary components 132 and sends control signals to the secondary component(s) 132 based on the received output. The secondary component 132 may be a user interface in various embodiments. For example, the secondary component 132 may include a display that is controlled by the controller 130. In various embodiments, the secondary component 132 is an actuator configured to move the part. The control signal from the controller 130 causes the actuator to move the part differently dependent on the received output. The secondary component 132 may be associated with the lighting device 126. The control signal from the controller 130 may cause the lighting device 126 to change lighting of the part dependent on the received output.

In an exemplary embodiment, the controller 130 is operably coupled to the vision device 120 and controls operation of the vision device 120. For example, the controller 130 may cause the vision device 120 to take an image or retake an image. In various embodiments, the controller 130 may move the camera 122 to a different location, such as to image the part 102 from a different angle. In various embodiments, the controller 130 may be operably coupled to the manipulator 116 to control operation of the manipulator 116. For example, the controller 130 may cause the manipulator 116 to move the part 102 into or out of the inspection station 110. The controller 130 may cause the manipulator 116 to move the part 102 within the inspection station 110, such as to move the part 102 relative to the camera 122.

The controller 130 may be operably coupled to the lens 124 to change the imaging properties of the vision device 120, such as the field of view, the focus point, the zoom level, the resolution of the image, and the like. For example, the lens 124 may be automatically adjusted by the controller 130, such as when the image quality is too low (for example, below a quality threshold).

The controller 130 may be operably coupled to the lighting device 126 to change the imaging properties of the vision device 120. For example, the brightness, the intensity, the color or other lighting properties of the lighting device 126 may be altered or changed to enhance the image quality. For example, the lighting device 126 may be automatically adjusted by the controller 130, such as when the image quality is too low (for example, below a quality threshold).

The part inspection station 110 includes a part inspection module 150 operably coupled to the controller 130. The controller 130 may control operation of the part inspection module 150. In various embodiments, the part inspection module 150 may be embedded in the controller 130 or the part inspection module 150 and the controller 130 may be integrated into a single computing device. The part inspection module 150 receives the digital image of the part 102 from the vision device 120. The part inspection module 150 analyzes the digital image and generates outputs based on the analysis. The output is used by the controller 130, such as for other control functions of the part inspection system 100. In an exemplary embodiment, the part inspection module 150 includes one or more memories 152 for storing executable instructions and one or more processors 154 configured to execute the executable instructions stored in the memory 152 to inspect the part 102.

In an exemplary embodiment, the part inspection module 150 includes an image quality module 160 and an image classifier module 170. The image quality module 160 analyzes the digital image to determine if the digital image achieves a quality threshold. The image quality module 160 generates an image quality output based on the analysis of the digital image. The image quality output is based on the quality threshold. In various embodiments, the image quality output may be a binary output, such as corresponding to the image quality being "good" if above the quality threshold or the image quality being "bad" if below the quality threshold. Optionally, the image quality output is a "pass output" if the digital image passes the quality threshold and the image quality output is a "fail output" if the digital image fails the quality threshold. In other embodiments, the image quality output may be a scalar output, such as an output on a scale of between 1 and 10 or between 1 and 100. The quality threshold may be adjustable, such as manually by a user or automatically by an AI learning module. The image quality module 160 may include one or more processors configured to analyze the digital image to determine if the digital image achieves the quality threshold.

In an exemplary embodiment, the image quality module 160 analyzes the digital image based on image lighting. For example, the quality threshold is based on image lighting. The image lighting quality is based on at least one of light intensity, ambient lighting, background lighting or other lighting properties. If one or more of the light intensity, ambient lighting, or background lighting is poor, the image quality may be of too poor quality for proper analyzing to identify defects. For example, the poor image quality may lead to too many false positives or too many false negatives. It is desirable to ensure sufficient image quality for analysis by the image classifier module 170, such as image quality above the quality threshold. In an exemplary embodiment, the image quality module 160 analyzes the digital image based on image clarity. For example, the quality threshold is based on image clarity. The image clarity quality is based on at least one of image resolution, working distance of the vision device from the part, background behind the part, focus of the lens of the vision device, zoom level of the vision device, and the like. If one or more of the image resolution, working distance of the vision device from the part, the background behind the part, the focus of the lens of the vision device, or the zoom level of the vision device is poor, the image quality may be of too poor quality for proper analyzing to identify defects. For example, the poor image quality may lead to too many false positives or too many false negatives. It is desirable to ensure sufficient image quality for analysis by the image classifier module 170, such as image quality above the quality threshold.

The image classifier module 170 analyzes the digital image to classify the image as a defective part or a non-defective part. In an exemplary embodiment, operation or use of the image classifier module is based on the quality output from the image quality module 160. For example, the image classifier module 170 does not analyze the image if the digital image fails the quality threshold. In an exemplary embodiment, the quality output from the image quality module 160 is a trigger for the image classifier module 170. For example, the image classifier module 170 analyzes the image only if receiving the "pass output" from the image quality module 160. The image classifier module 170 does not analyze the image if receiving the fail output from the image quality module 160. In an exemplary embodiment, the image classifier module 170 includes one or more processors configured to analyze the digital image to classify the image as a defective part or a non-defective part.

In an exemplary embodiment, the part inspection module one or more of the memories 152, such as the memory associated with the image classifier module 170, stores a neural network architecture 172 having a plurality of convolutional layers 174, a plurality of pooling layers 176 disposed after different convolutional layers 174 and spaced apart from each other, and an output layer 178. The neural network architecture 172 is a VGG neural network. The processor 154 associated with the image classifier module 170 is configured to analyze the digital image through the layers of the neural network architecture 172 to output one of a defective output or a non-defective output based on the image analysis of the digital image through the neural network architecture 172. Optionally, the neural network architecture 172 performs a principle component analysis to perform feature extraction. The principle component analysis uses reduction techniques to identify the most useful features and performs the feature extraction on the useful features. For example, the principle component analysis may determine the number of features that make up 80% (or other threshold amount) of the cumulative variance of the principle components. The useful features (those that make up over 80% of the cumulative variance) are the best or most powerful features to use in the image analysis process to get the best results. The useful features are used by the neural network architecture 172 to perform the image analysis. For example, the image classifier module 170 analyzes the digital image based on the feature extraction.

In an exemplary embodiment, the neural network architecture 172 is stored as executable instructions in the memory 152. The processor 154 uses the neural network architecture 172 by executing the stored instructions. The neural network architecture 172 is used for defect detection in an exemplary embodiment. For example, the neural network architecture 172 analyzes the digital images from the vision device 120 to classify the part 102 as defective or non-defective. In an exemplary embodiment, the neural network architecture 172 analyzes the digital images from the vision device 120 to determine if any defects, such as the burrs 108 in the cross hole 104, are present in the images. In an exemplary embodiment, the neural network architecture 172 uses a trained, machine learning artificial intelligence (AI) module 180 to analyze the images. The neural network architecture 172 may be trained using training images. For example, the training images may be images of various parts having cross holes. Some of the training images are images of defective parts, such as those including burrs, while other images are images of non-defective parts, such as those devoid of burrs. The images may be randomly rotated and flipped during training to enhance the machine learning AI training module. The AI module 180 is operable in a training mode. At least one of the image quality module 160 or the image classifier module 170 is updated by the AI module 180 when operated in the training mode.

Figure 4:
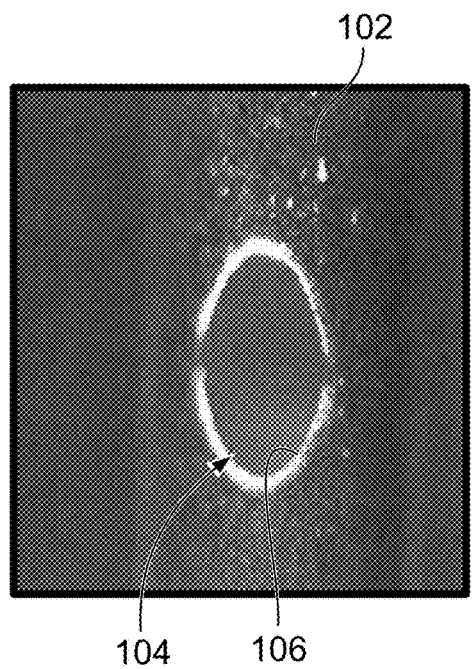
FIG. 4 illustrates images of parts taken by the part inspection system in accordance with an exemplary embodiment.
Figure 5:
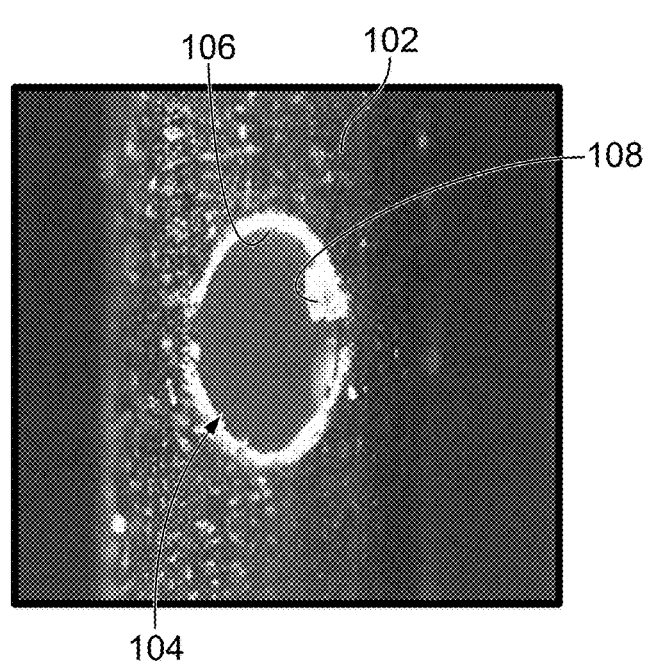
FIG. 5 illustrates images of parts taken by the part inspection system in accordance with an exemplary embodiment.

FIGS. 4 and 5 are images of parts taken by the part inspection system 100 in accordance with an exemplary embodiment. FIG. 4 illustrates the part 102 having a defect. FIG. 5 illustrates the part 102 without any defects. FIGS. 4 and 5 can be compared to FIGS. 2 and 3. FIGS. 2 and 3 illustrate high quality images of the parts 102 while FIGS. 4 and 5 illustrate low quality images of the parts 102. The high quality images (FIGS. 2 and 3) have good lighting and the clarity is sufficient to analyze for defects. The defects in FIG. 2 are easily identified by the image classifier module 170 of the part inspection module 150. Similarly, the image classifier module 170 easily identifies that the image in FIG. 3 is devoid of defects. Analysis of the high quality images leads to high classification accuracy. In contrast, the low quality images (FIGS. 4 and 5) have poor lighting and the clarity is insufficient for accurately identifying defects. Analysis of the low quality images would lead to false positives and false negatives. For example, the analysis would incorrectly classify the images as defective even though the part does not include any defects or would incorrectly classify the images as non-defective even though the part does include defects. As such, initial image quality analysis of the images (to ensure that the images meet a quality threshold) allows the part inspection module 150 to only analyze good quality images with the image classifier module 170 for classification. The image quality module 160 determines if the image has "good" quality or "bad" quality. If the image is determined to be "bad" quality, the operator may be prompted and/or the controller 130 may take action to enhance the image (for example, make adjustments and retake the image). If the image is determined to be "good" quality, the image is analyzed by the image classifier module 170 for defects.

Figure 6:
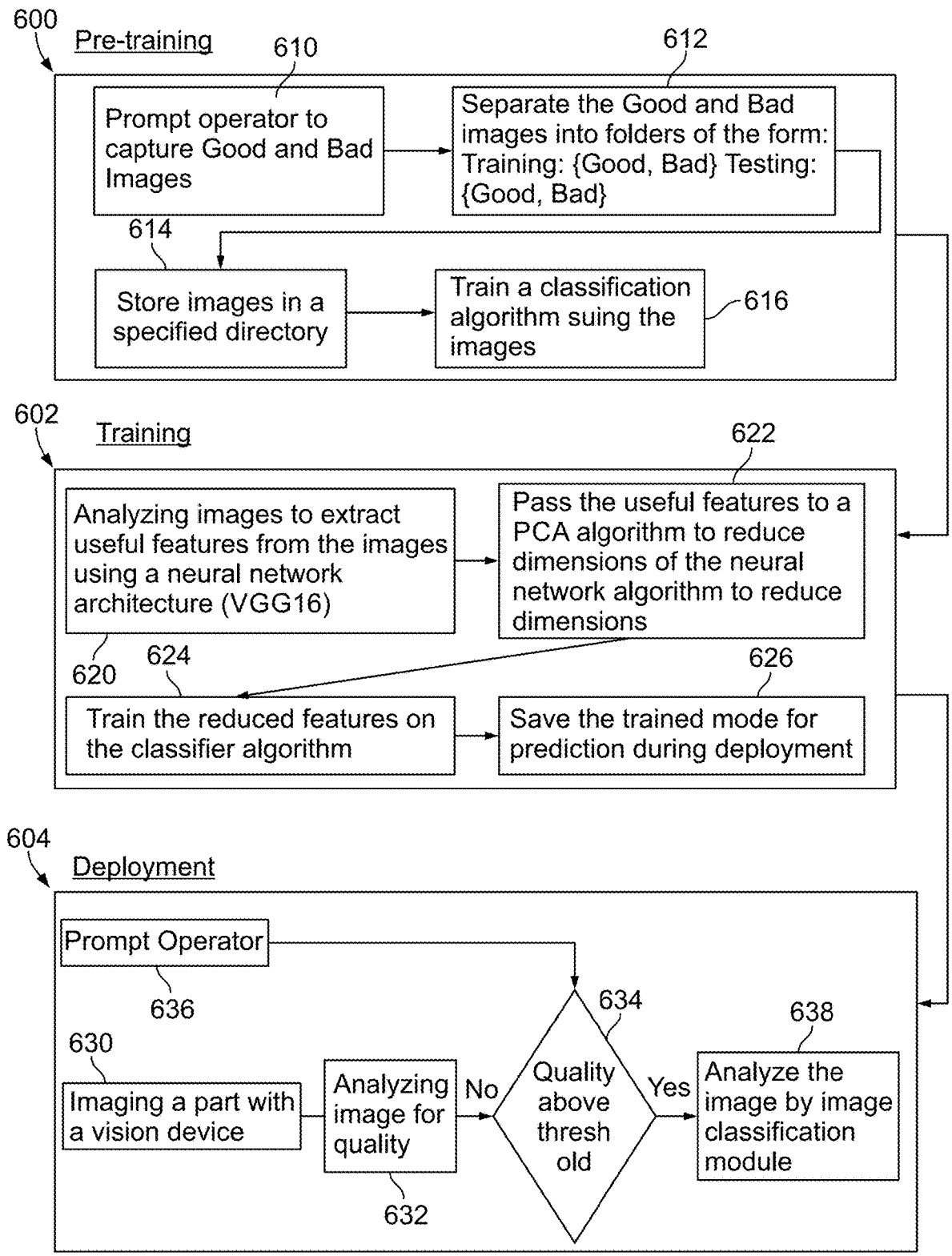
FIG. 6 is a flow chart of a method of operating a part inspection system in accordance with an exemplary embodiment.

FIG. 6 is a flow chart of a method of operating a part inspection system 100 in accordance with an exemplary embodiment. The method includes a pre-training operation 600, a training operation 602 and a deployment operation 604.

The pre-training operation 600 includes the step of prompting 610 an operator to capture "good" and "bad" images. The good images are images above a quality threshold. The bad images are images below a quality threshold. The good images have good lighting and good image clarity. The bad images have poor lighting and poor image quality. The image quality may be affected by adjusting lighting intensity, lighting brightness, lighting color, background lighting, and the like. The image quality may be affected by adjusting clarity by changing the field of view, the resolution, the zoom level, and the like. A sufficient number of images may be captured for training. The pre-training operation 600 includes the step of separating 612 the good and bad images into a database or digital folder structure of the form: Training: {Good, Bad}, Testing: {Good, Bad}. The classified images can be used by models for both the training operation 602 (Training) and the deployment operation 604 (Testing). The pre-training operation 600 includes the step of storing 614 the images in the specified directory. The pre-training operation 600 includes the step of training 616 a classification algorithm using the images. The good and bad images are used by an AI learning module to enhance the processing and operation of the part inspection system. The part inspection system is able to learn ideal lighting conditions and image clarity conditions (for example, resolution, field of view, and the like) most useful for the system to make accurate defect classifications for the parts. The image quality module of the part inspection system may be used for lighting calibration o the system to ensure that similar lighting conditions used during training are also used during deployment. The image quality module uses AI to automatically learn the variations of good lighting and bad lighting, and thus ensure that good lighting conditions are used during deployment and maintained during the production cycle. If lighting conditions change, the operator may be notified by the system.

The training operation 602 includes the step of analyzing 620 the images (for example, Training: {Good, Bad}) to extract useful features from the images using a neural network architecture (for example, VGG16) feature extractor. For example, the useful features associated with high quality images are extracted and the features associated with poor quality images are suppressed or disregarded. The images may be analyzed by loading the images into a processor and reading the images at the processor, such as through the various convolution and pooling layers. The training operation 602 includes the step of passing 622 the useful features from the feature extraction to a principle component analysis (PCA) algorithm to reduce dimensions of the neural network algorithm. The training operation 602 includes the step of training 624 the reduced features on the classifier algorithm used by the image classifier module, such as the last layer of the classifier algorithm. The training operation 602 includes the step of saving 626 the trained model for prediction during the deployment operation 604. The reduction of features utilized by the system when analyzing images simplifies the model, thus enhancing performance. The number of images needed for training is reduced by having a reduction in features used in the analysis. The ability of the model to generalize to new images or features is enhanced.

The deployment operation 604 includes the step of taking 630 an image of a part with a vision device (for example, camera) of the part inspection system. The deployment operation 604 includes the step of analyzing 632 the image for quality using an image quality module. The image quality module may use the Testing: {Good, Bad} images from the pre-training operation 600 when analyzing the quality of the deployment image. The deployment operation 604 includes the step of determining 634 if the image quality is above a quality threshold. If the image quality is "bad" and below the quality threshold, the operator is prompted at step 636. The image is not further analyzed for classification. If the image quality is "good" and above the quality threshold, the image is analyzed 638 by an image classification module to determine if there are defects in the part, such as burrs in a cross hole of the part. The classification algorithm used by the image classification module is based, at least in part, on the trained model generated by the training operation 602. The classification algorithm used by the image classification module may be based, at least in part, on the Testing: {Good, Bad} images from the pre-training operation 600.

Figure 7:
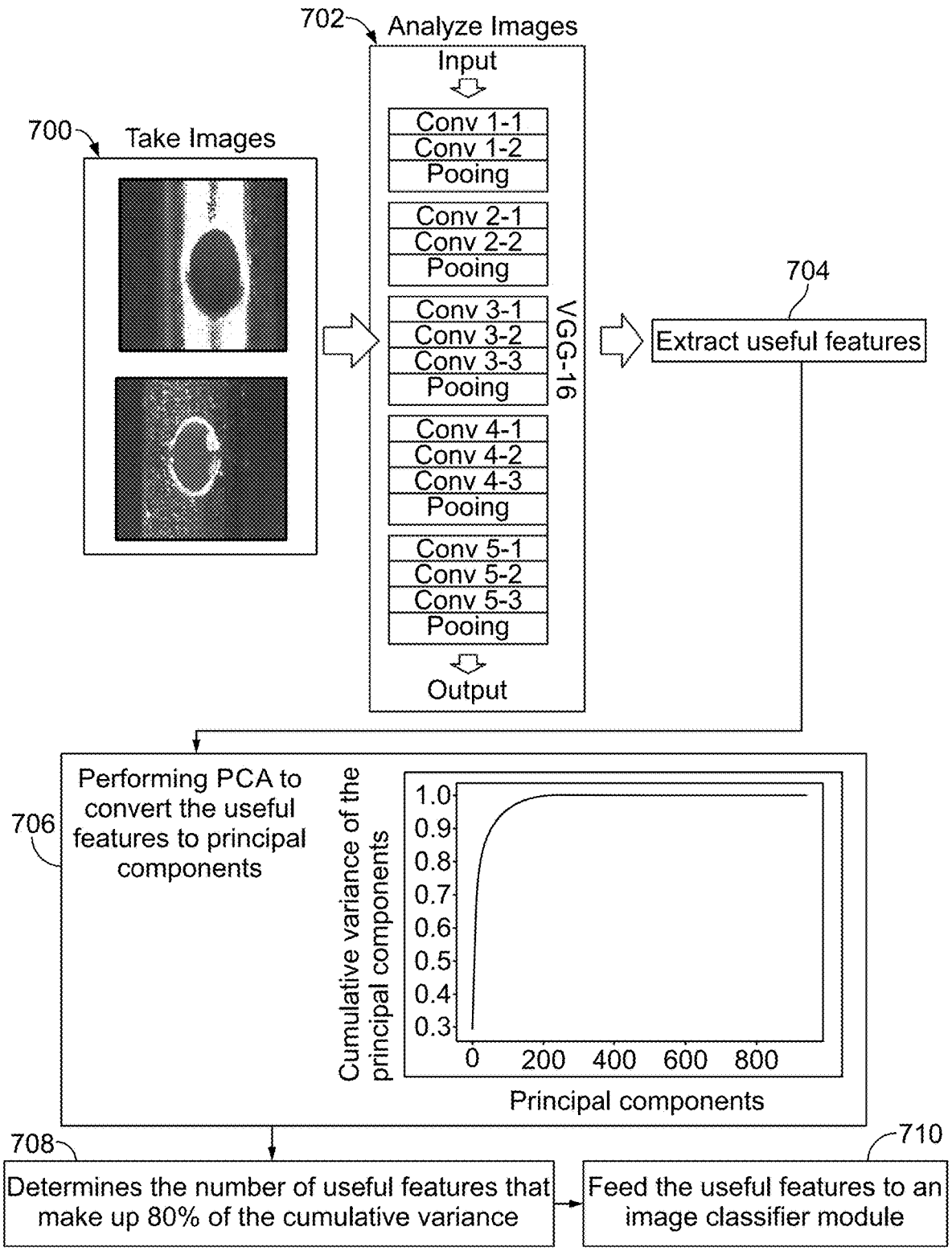
FIG. 7 is a flow chart of a method of operating a part inspection system in accordance with an exemplary embodiment.

FIG. 7 is a flow chart of a method of operating a part inspection system 100 in accordance with an exemplary embodiment. The method includes the step of taking 700 images of a part with a vision device (for example, camera) of the part inspection system. The method includes the step of analyzing 702 the image using a neural network architecture, such as a VGG neural network. One or more processors associated with an image classifier module may be used to analyze the digital image through the layers of the neural network architecture. The method includes extracting 704 useful features from the neural network architecture. The method includes performing 706 a principle component analysis to convert the useful features to principle components and determining 708 the number of features that make up 80% (or other threshold amount) of the cumulative variance of the principle components. The method includes feeding 710 the useful features (those that make up over 80% of the cumulative variance) to an image classifier module. The useful features may be used by the image classifier module for training or for deployment and classification of images. The useful features are used by the image classifier module to perform image analysis to identify defects with the part and thus to classify the image as defective or non-defective.

With additional reference back to FIG. 1, the neural network architecture 172 is implemented by the part inspection module 150, including the one or more memories 152 and the one or more processors 154. Optionally, the image quality module 160 and/or the image classifier module 170 may include neural network architectures 172 and/or memories 152 and/or processors 154 for operation of the processes performed by the respective modules 160, 170. For example, the image quality module 160 determines image quality and ensures that the image quality is sufficient (above a quality threshold) to perform the further classification analysis by the image classifier module 170.

The processor 154 is operative to perform exemplary method steps, or in the form of a non-transitory computer readable medium embodying computer executable instructions which when executed by a computer (for example, the controller 130 or a computer employing the controller 130 or operated by the controller 130) cause the computer to perform exemplary method steps. The computer system may be a cloud computing node. Examples of well-known computing systems, environments, and/or configurations that may be suitable for operation of the neural network architecture 172 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. One or more embodiments can make use of software running on a general purpose computer or workstation.

In an exemplary embodiment, the controller 130 receives the output from the part inspection module 150. For example, the controller 130 may receive either a 0 or a 1, indicating PASS/NON-DEFECTIVE or FAIL/DEFECTIVE, respectively. In an exemplary embodiment, the output is used by the controller 130 for other control functions of the part inspection system 100. For example, the controller 130 may cause the part to be moved after receiving the output. The controller 130 may control the manipulator 116 to move the part out of the inspection station 110. In various embodiments, the controller 130 may cause the part to move to one direction/location/bin/machine/station if defective and cause the part to move to a different direction/location/bin/machine/station is non-defective. In other various embodiments, the controller 130 is coupled to a user interface 134. The user interface 134 may include an indicator to indicate to the operator the status of the output. For example, the indicator may include a display and/or a visual indicator and/or an audible indicator to indicate to the operator the status (for example, PASS/FAIL). The operator may then manually discard the defective parts.

During operation of the neural network architecture 172, the part inspection module 150 runs programs to analyze the image. For example, the part inspection module 150 operates programs stored in the memory 152 on the processor 154. The processor 154 may include computer system executable instructions, such as program modules, being executed by a computer system. Generally, program modules may include routines, programs, objects, components, logic, data structures, and so on that perform particular tasks or implement particular abstract data types. The computing may be practiced in distributed cloud computing environments where tasks are performed by remote processing devices that are linked through a communications network. In a distributed cloud computing environment, program modules may be located in both local and remote computer system storage media including memory storage devices.

In an exemplary embodiment, various components may be communicatively coupled by a bus, such as the memory 152 and the processors 154. The bus represents one or more of any of several types of bus structures, including a memory bus or memory controller, a peripheral bus, an accelerated graphics port, and a processor or local bus using any of a variety of bus architectures.

The part inspection module 150 may include a variety of computer system readable media. Such media may be any available media that is accessible by the part inspection module 150, and it includes both volatile and non-volatile media, removable and non-removable media. The memory 152 can include computer system readable media in the form of volatile memory, such as random access memory (RAM) and/or cache memory. The part inspection module 150 may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. The memory 152 may include at least one program product having a set (e.g., at least one) of program modules that are configured to carry out the functions of embodiments of the invention.

One or more programs may be stored in the memory 152, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the subject matter described herein.

The part inspection module 150 may also communicate with one or more external devices, such as through the controller 130. The external devices may include a keyboard, a pointing device, a display, and the like; one or more devices that enable a user to interact with system; and/or any devices (e.g., network card, modem, etc.) that enable the system to communicate with one or more other computing devices. Such communication can occur via Input/Output (I/O) interfaces. Still yet, part inspection module 150 can communicate with one or more networks such as a local area network (LAN), a general wide area network (WAN), and/or a public network (e.g., the Internet) via network adapter. Other hardware and/or software components could be used in conjunction with the system components shown herein. Examples include, but are not limited to: microcode, device drivers, redundant processing units, and external disk drive arrays, RAID systems, tape drives, and data archival storage systems, etc.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 154, memory 152, and input/output interface can be interconnected, for example, via the bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with suitable media.

Accordingly, computer software including instructions or code for performing the methodologies of the subject matter herein may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A part inspection system comprising:
a vision device configured to image a part being inspected and generate a digital image of the part;
a part inspection module communicatively coupled to the vision device and receiving the digital image of the part, the part inspection module including an image quality module, the image quality module analyzing the digital image to determine if the digital image achieves an image quality threshold for the image, the image quality module generating an image quality output based on the analysis of the digital image, the part inspection module including an image classifier module, the image classifier module analyzing the digital image to classify the part shown in the image as a defective part or a non-defective part, wherein the image classifier module does not analyze the image if the digital image fails the image quality threshold.

2. The part inspection system of claim 1, wherein the image quality module includes one or more processors configured to analyze the digital image to determine if the digital image achieves the image quality threshold.

3. The part inspection system of claim 1, wherein the image classifier module includes one or more processors configured to analyze the digital image to classify the part shown in the image as a defective part or a non-defective part.

4. The part inspection system of claim 1, wherein the image quality module analyzes the digital image based on image lighting.

5. The part inspection system of claim 4, wherein the image lighting is based on at least one of light intensity, ambient lighting, and background lighting.

6. The part inspection system of claim 1, wherein the image quality module analyzes the digital image based on image clarity.

7. The part inspection system of claim 6, wherein the image clarity is based on at least one of image resolution, working distance of the vision device from the part, background behind the part, focus of a lens of the vision device, zoom level of the vision device.

8. The part inspection system of claim 1, wherein the image quality output is a pass output if the digital image passes the image quality threshold and the image quality output is a fail output if the digital image fails the image quality threshold, the image classifier module analyzing the image only if receiving the pass output from the image quality module.

9. The part inspection system of claim 1, wherein the part inspection module includes an artificial intelligence (AI) module to analyze the images, the AI module operable in a training mode, at least one of the image quality module or the image classifier module is updated in the training mode.

10. The part inspection system of claim 1, wherein the part inspection module includes a memory for storing a neural network architecture having a plurality of convolutional layers, a plurality of pooling layers disposed after different convolutional layers and spaced apart from each other, and an output layer, the image classifier module including a processor configured to analyze the digital image through the layers of the neural network architecture to output one of a defective output or a non-defective output based on the image analysis of the digital image through the neural network architecture.

11. The part inspection system of claim 10, wherein the neural network architecture performs a principle component analysis to perform feature extraction, the image classifier module analyzing the digital image based on the feature extraction.

12. The part inspection system of claim 10, wherein the neural network architecture includes a VGG neural network.

13. The part inspection system of claim 1, further comprising a controller, the controller being operably coupled to the vision device to control operation of the vision device, the controller being operably coupled to the part inspection module and receiving an output of the part inspection module, the controller being operatively coupled to a secondary component and sending a signal to the secondary component based on the received output.

14. The part inspection system of claim 13, wherein the secondary component is an actuator configured to move the part, the signal from the controller causing the actuator to move the part differently dependent on the received output.

15. The part inspection system of claim 13, wherein the secondary component is a lighting device, the signal from the controller causing the lighting device to change lighting of the part dependent on the received output.

16. The part inspection system of claim 13, wherein the secondary component is a user interface having an indicator, the signal from the controller causing the indicator to operate differently dependent on the received output.

17. The part inspection system of claim 1, wherein the vision device includes a camera configured to image a cross hole and surrounding areas of the part including any burr defects in the cross hole, the neural network architecture analyzing the image to determine if the burr defects are present or absent.

18. A part inspection method comprising:
    imaging a part using a vision device to generate a digital image;
    analyzing the digital image through an image quality module of a part inspection system by comparing the digital image to an image quality threshold to determine if the digital image passes or fails the image quality threshold for the image;
    analyzing the digital image through an image classifier module of the part inspection system, if the digital image passes the image quality threshold, to determine if the part shown in the image is defective or non-defective, wherein the image classifier module does not analyze the image if the digital image fails the image quality threshold; and
    outputting one of a defective output or a non-defective output based on the image analysis of the digital image.

19. The part inspection method of claim 18, wherein said analyzing the digital image through an image quality module includes analyzing the digital image based on image lighting and based on image clarity.

* * * * *